United States Patent [19]

Meining et al.

[11] 4,236,766

[45] Dec. 2, 1980

[54] ROLLER HAVING SUPPORTING BODY BETWEEN OUTER TREAD BODY AND INNER BEARING

[75] Inventors: Hans Meining; Egon Pfaller, both of Dittelbrunn; Otmar Winkler; Hilmar Kittel, both of Schweinfurt, all of Fed. Rep. of Germany

[73] Assignee: SKF Kugellagerfabriken GmbH, Schweinfurt, Fed. Rep. of Germany

[21] Appl. No.: 960,949

[22] Filed: Nov. 15, 1978

[30] Foreign Application Priority Data

Nov. 16, 1977 [DE] Fed. Rep. of Germany ... 7735148[U]
Jul. 20, 1978 [DE] Fed. Rep. of Germany ... 7821746[U]

[51] Int. Cl.³ .............................................. F16C 35/04

[52] U.S. Cl. ..................................... 308/15; 308/177; 308/189 R

[58] Field of Search ................... 308/189 R, 190, 191, 308/199, 15, 16, 177, 207 R

[56] References Cited

U.S. PATENT DOCUMENTS

| | | | |
|---|---|---|---|
| 1,944,291 | 1/1934 | Lundvall | 308/189 R |
| 2,152,685 | 4/1939 | Grunge et al. | 308/189 R X |

*Primary Examiner*—Frederick R. Schmidt
*Attorney, Agent, or Firm*—Daniel M. Rosen

[57] ABSTRACT

A roller assembled from separately prefabricated parts has an outer tread body of an elastic material, a supporting body and, disposed therein, a rolling-element bearing, the supporting body holding the various parts together.

21 Claims, 10 Drawing Figures

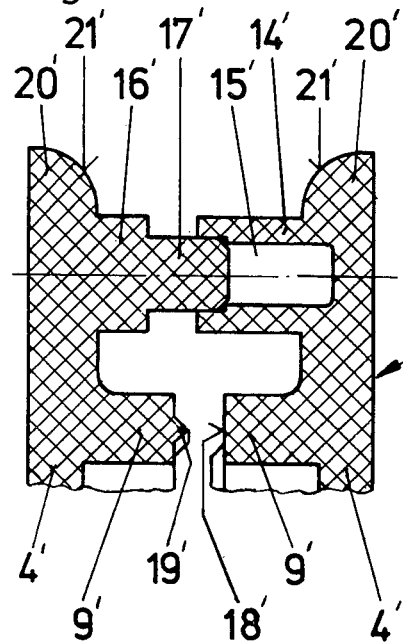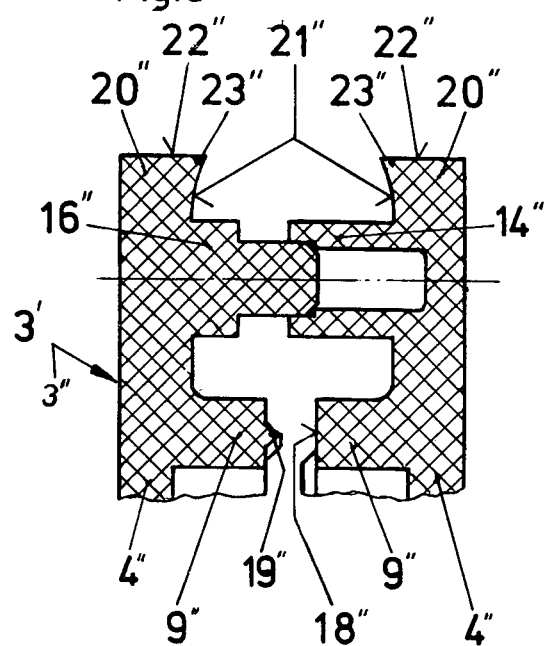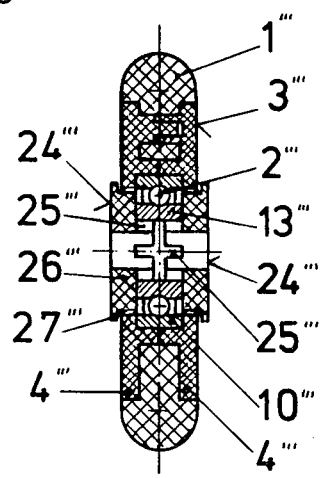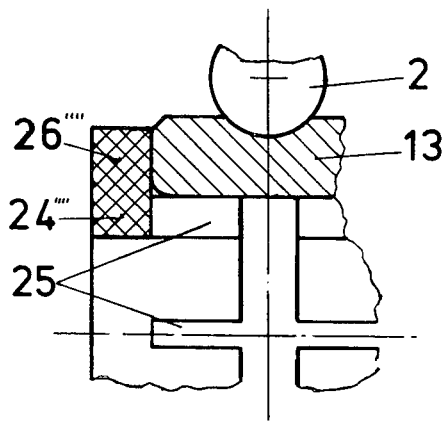

ROLLER HAVING SUPPORTING BODY BETWEEN OUTER TREAD BODY AND INNER BEARING

BACKGROUND OF THE INVENTION

It is known to assemble rollers from a plurality of parts and to rotatably support them on rolling-element bearings. In such prior art designs, a tread body, such as a tire, is either wedged between a split wheel rim whose components are joined together by a friction fit, or is mounted, by molding the material from which the tread body or tire is fabricated while in a fluidous state, on a plastic supporting body which is deformable so that it can be pressed over the outer ring of a rolling-element bearing. Such known designs essentially have a drawback in that they are complex in requiring a great number of individual parts or requiring complex operations for their assembly thereby making them expensive. Long term operability, and reliability, particularly with rough use, is also difficult to attain with such known designs.

SUMMARY OF THE INVENTION

To overcome the above-described shortcomings of the prior art, there is disclosed, in accordance with the present invention, a roller assembled from separately prefabricated parts in which a supporting body is formed from two components each in the form of a circular half shell and each having a plurality of pins which are distributed over one surface of the respective shell and projecting axially to penetrate the outer tread body, and each half shell further having an inner circular rim from which there extends an axially projecting circular shoulder or lug directed toward that on the other half shell, so that the lugs meet to form a sleeve encircling the outer ring of the rolling-element bearing.

The pins of each half shell can extend through corresponding apertures in the side wall of the other half shell and can be deformed on the ends which pass through and emerge from the apertures to prevent their withdrawal and, hence, fasten the two half shells together. The pins may be peened over or riveted at their free ends to form heads, for example, a cross-shaped punch may be used to peen over the emerging ends of the pins.

In another embodiment of the invention, the apertures in the shells may be replaced by pins having hollow bores with diameters substantially equal to the outer diameters of the solid pins so that the axially projecting respective solid and hollow pins of the two half shells can be made to mesh, with a solid pin or projection disposed in the recess of a hollow pin. Said pins may suitably be constructed so that the pins of a half shell are alternately provided with a recess (hollow) or a projection (solid).

By using this type of design of a half shell, two identical half shells can be used to construct the supporting body of a roller, the shells being oriented relative to each other so that a solid pin provided with a projection is in registration with a hollow pin having a recess.

To compensate for dimensional variations due to manufacturing tolerances for the seating surfaces of the roller-element bearing in the supporting body, the seat for receiving the outer ring of the rolling-element bearing, formed by the axially projecting opposed circular shoulders, is, in accordance with a further characteristic of the invention, provided with a plurality of radially inwardly directed projections which are distributed over the periphery of the inner circular rims of the shells.

The supporting body of the roller in accordance with the invention may be made of various materials. With higher ambient temperatures and high loads, the half shells of the supporting body are suitably manufactured from a material that has good thermal conductivity, for example, pressure-cast aluminum. In this case, each half shell of the supporting body may be provided with ribs or the like to increase the area of the heat-radiating surfaces. Moreover, it is also possible to use other materials, such as plastics, for the manufacture of the half shells of the supporting body, the two half shells then being joined to each other, for example, by ultrasonic welding.

In order to prevent lateral displacement of the tread body, from the outer rim of the supporting body formed by each pair of shell components, it is advantageous, in accordance with a further characteristic of the invention, to curve the mutually facing portions of outer circular rims of the half shells of the supporting body convexly or concavely, with respect to the tread body.

In order to minimize noise in the roller in accordance with the invention, plastic bushings having outwardly directed flanges may be inserted from the respective sides of and into the bore of the inner ring of the rolling-element bearing disposed in the supporting body. In particular installations, the outwardly directed flange of the bushing may be so enlarged as to extend beyond the corresponding inner rim of the half shell of the supporting body to form a seal with it.

In accordance with a further characteristic of the invention, one or a plurality of notches or projections can be evenly distributed over the outer circumference of the bushing where it engages the interior or bore of the bearing to permit resilient mounting of the bushing in the inner-ring bore of the rolling-element bearing.

It is thus an object of the invention to provide an improved roller of the type outlined above.

Another object of the invention is to provide a roller which can be manufactured and assembled by simple means from simple, uncomplicated parts, and hence economically.

Still another object of the invention is to provide a roller having long term operational reliability at high loads and under unfavorable environmental conditions.

Other and further objects of the invention will be apparent from the accompanying drawings and descriptions of several preferred embodiments of the invention in which like reference numerals are used to refer to like parts in the various views.

DESCRIPTION OF THE DRAWINGS

FIG. 7 is an enlarged portion of the cross-section of the supporting body of the roller according to FIG. 4 at the time of assembly, the other parts of the roller having been omitted for greater clarity;

FIG. 8 shows a portion of a modified form of a supporting body;

FIG. 9 is a cross-section through a further embodiment of a roller having bushings disposed in the bore of the inner ring of the rolling-element bearing; and FIG. 10 is an enlarged portion of the cross-section through the roller bearing according to FIG. 9.

DESCRIPTION OF THE PREFERRED EMBODIMENT

Figure 2:
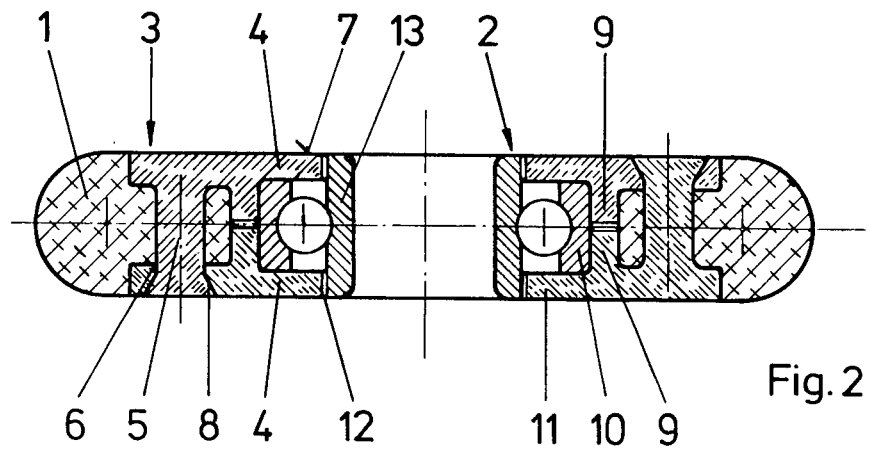
FIG. 2 is a cross-section along the line A—A in FIG. 1 of a roller having a supporting body made of pressure-cast aluminum, for example.
Figure 1:
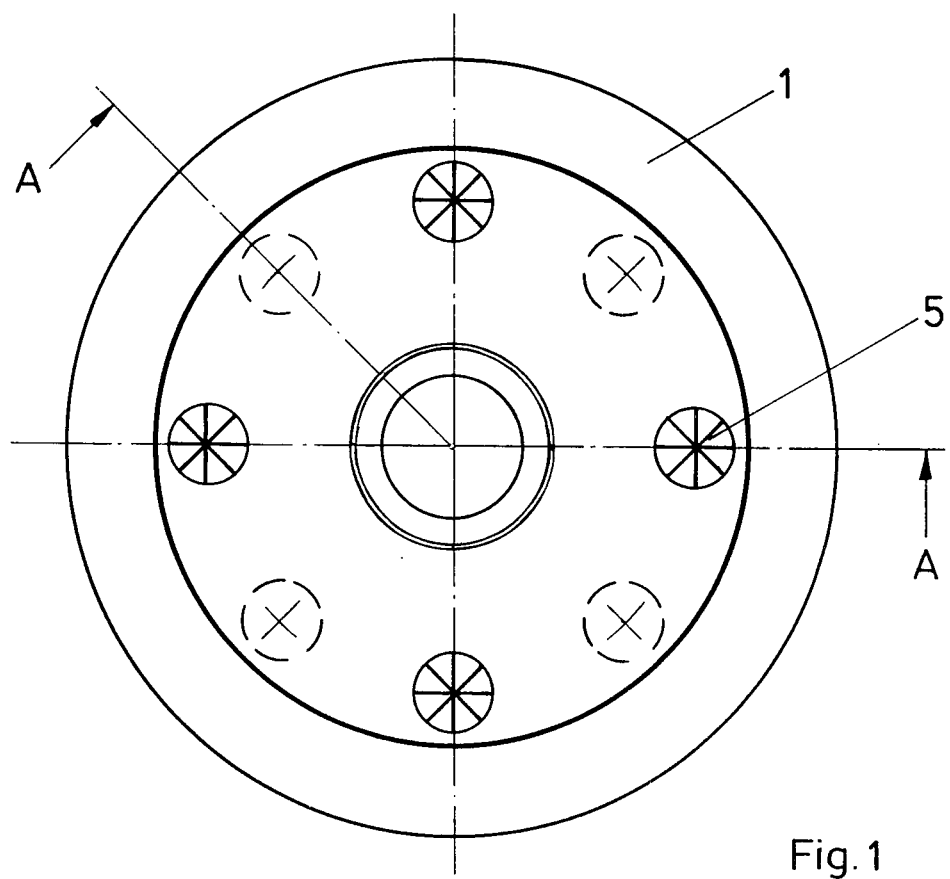
FIG. 1 is a side elevation.
Figure 3:
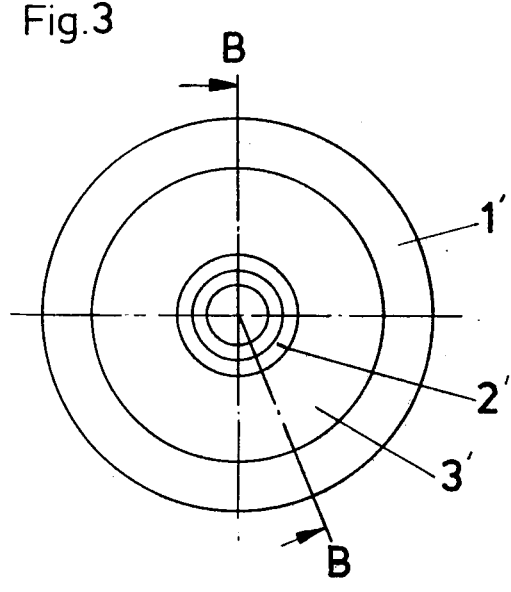
FIG. 3 is a side elevation; and p

The roller shown in FIGS. 1 and 2 consists of an outer tread body 1 made of an elastic (rubberlike or similar) material, for example a tire, a rolling-element bearing 2, and a supporting body 3 disposed between them. As shown in FIG. 2, the supporting body 3 is formed of two identically shaped half shells 4. Each half shell 4 can be made of pressure-cast aluminum and has four pins 5 which are arranged in a circle with the shells oriented so that the pins of either shell alternate and are substantially equally angularly displaced from one another. The pins of each half shell penetrate the tread body 1, extend through opposite holes 6 in the other half shell 4, and on the outside 7 of the latter are deformed so as to form a rivet head 8. In the vicinity of the inner rim of each half shell 4, there is an axially projecting circular or ring-shaped shoulder or lug 9, said lugs 9 being directed toward each other and forming with their inner cylindrical surfaces a seat for the outer ring 10 of the rolling-element bearing 2 for supporting the outer ring 10. In this way, the pins 5 of each half shell 4 alternately penetrate and pass through the circular tread body 1 to connect with the other half shell. To peen over or rivet the free ends 8 of the pins 5, of each half shell which extend through the corresponding aperture in the other half shell a die having a cruciform cross-section can be used. In this way, individual portions of the face of the pins 5 are deformed without the pins being broken, as might be the case if other means of deformation were used, particularly when an aluminum pressure casting is employed. Instead of using a die with a cross-shaped configuration for peening over the free ends of the pins, a die having a plurality of parallel fillets may be used.

As can be seen from FIG. 2, the two half shells 4 may be provided with radially inwardly extending annular projections 11 which extend all the way to the outer cylindrical surface 12 of the enlarged inner ring 13 of the rolling-element bearing 2 to form seals at the interfaces of the projections 11 with the ring surface 12 for the rolling-element bearing 2.

Shown in FIGS. 3 to 7 is an alternate embodiment of a roller in accordance with the invention. It, too, consists of an outer tread body 1', made of an elastic (rubberlike or similar) material, a rolling-element bearing 2' with lateral sealing disks 11', and a supporting circular body 3' disposed between them which, in this case, is made of plastic.

Figure 4:
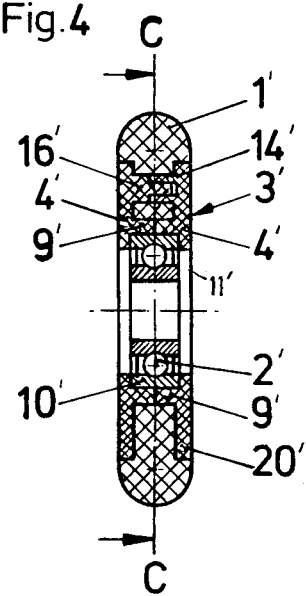
FIG. 4 is a cross-section along the line B—B in FIG. 3 of a further embodiment of a roller.
Figure 5:
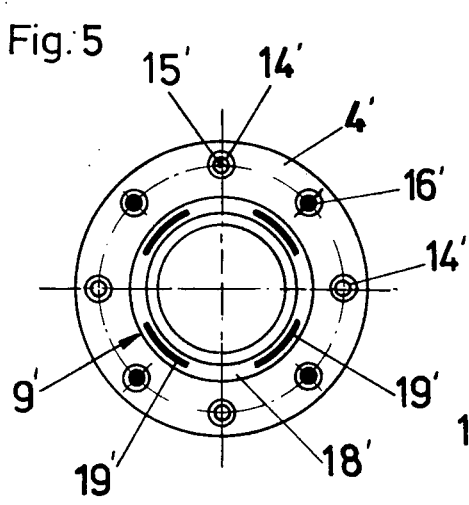
FIG. 5 is a side elevation (of the interior) of a half shell of the roller according to FIGS. 3 and 4.

As shown in FIG. 4, the supporting body 3' is formed of two identically shaped half shells 4' (see FIG. 5 also). Each of the half shells 4', which may be an injection-molded plastic part, has, disposed in alternating sequence in a circle, four hollow pins 14' having respective bores or recesses 15' in their ends distal from the shell and four solid pins 16' having respective projections 17' on their distal ends. The shells 4' are oriented so that after assembly of the two half shells 4', the projections 17' of one half shell 4' are disposed in the recesses 15' of the pins 14' of the other half shell 4'. An axially projecting circular or ring-shaped shoulder or lug 9' is provided adjacent the inner rim of the half shell 4' to receive the outer ring 10' of the rolling-element bearing. The inner edge 18' of the axial lug 9' has four identical arcuate-shaped projections 19' which are evenly distributed over the edge 18'. The arc lengths of the arcuate projections can be substantially equal to the spacing between them and are radially aligned with the solid pins 16' so that they can mesh when the half shells 4' are assembled to form the supporting body 2'.

Figure 6:
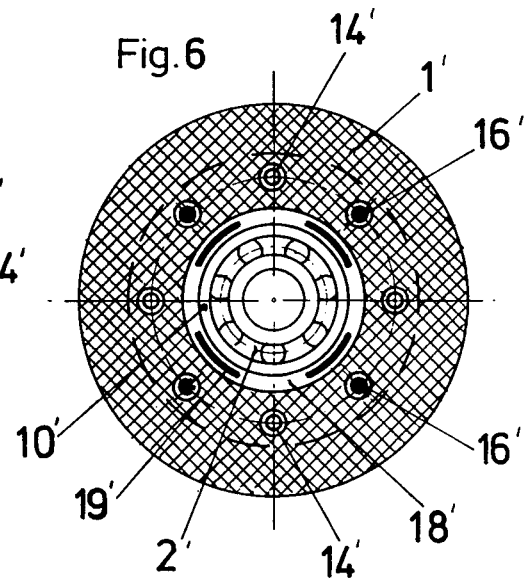
FIG. 6 is a section along the line C—C through the roller according to FIG. 4.

As may be seen particularly from FIGS. 4 and 6, the pins 14' and 16' penetrate the tread body 1' after the half shells 4' are joined together, thus providing effective anchorage of the tread body 1' to the supporting body 3'.

When the roller is to be used with high axial loads, as in the transportation of heavy goods, for example, the tread body 1' may also be provided in its central bore with a sleeve-like insert of metal or the like (not shown), which as such is known. Such an insert may be supported on the circular lugs 9' of the half shells 4', for example, or the insert may be provided in its bore with inwardly directed projections which penetrate the ring lugs 9' of the half shells 4' and which may cause the circular lugs 9' to bear on the circumference of the outer ring 10' of the rolling-element bearing 2' to enhance friction between the body 3' and outer ring 10'.

FIG. 7 shows an enlarged portion of a cross-section taken through a roller. The two half shells 4' of the supporting body 3' are provided at their outer rims with radially outwardly directed portions 20' having inner mutually opposed faces 21' which are curved convexly.

FIG. 8 shows the cross-section of a further embodiment of a supporting body 3'' of a roller. In this embodiment the outer rim portions 20'' of the half shell 4'' have mutually facing concave faces 21''. In this embodiment the advantage is that the outer surfaces of the tread body 1 can be supported on the cylindrical shoulder surface 22'' of the rim portions 20'' of the half shells 4'', and the circular edges 23'' formed by the concave construction of the faces 21'' are forced into the tread body 1 by the pressure exerted on the tread body 1 during assembly of the roller, thus further securing the tread body 1 to the support body 3''. When a weldable material is used for the tread body 1, the circular edge 23'' of the half shell 4'' may also be used as a welding edge and the supporting body 3'' may be welded to the tread body 1, with ultrasonic welding, commencing with the pins 14'' and 16'', continuing with the striplike elevations 19'' and concluding with the welding of the circular edges 23'' serving as welding edges.

The assembly of the separately prefabricated parts into a finished roller may advantageously be done in such a way that a rolling-element bearing 2 is disposed in the bore of a ring lug 9'' of a half shell 4'' with the bore of the ring lug 9'' receiving the outer ring 10 of the rolling-element bearing 2 in a force fit. Thereupon the outer tread body 1, which has apertures or bores corresponding to the total number of pins 14'' and 16'' on the two half shells 4'', is slipped onto the pins of one of the half shells 4'' and bears with its bore on the outer circumference of the ring lug 9'' of the half shell 4'' while the outer tread surface of the tread body 1 comes to abut on the rim portion 20'' of the half shell 4''. Then a second half shell is similarly mounted and the parts are joined together. In the embodiments according to FIGS. 3 through 8, the first half shell 4' or 4" is mounted oriented so that the pins 16' or 16" provided at their ends with projections 17' or 17" are exactly opposite the pins 14' or 14" having recesses in their ends, and/or that the four identical sections of the edges 18' or 18" of the ring lugs 9' or 9", each of which forms an octant, which comprise striplike projections 19' or 19", mesh to form a cylindrical surface. The assembled half shells 4' or 4" which in this embodiment are made of plastic, are then pressed together in a known manner and connected as by ultrasonic welding to form a solid supporting body 3' or 3". Here the welding of the half shells 4' or 4" may be initiated by welding the pins 14' or 14" and 16' or 16" together, and concluded by welding the ring lugs 9' or 9". The supporting body 3' or 3" assembled in this manner secures the outer tread body 1 against twisting, and in addition the axially facing ring lugs 9' or 9" of the half shells 4' or 4" result in the formation of an annular surface which provides assurance against slippage with respect to the inserted rolling-element bearing 2. The simple design of the parts and the ease with which they can be assembled make it possible to manufacture such rollers economically.

FIG. 9 shows a cross-section taken through a further embodiment of a roller. This roller is substantially identical to those shown in FIGS. 3 to 8. Here, however, there are resiliently mounted in the bore of the inner ring 13''' of the rolling-element bearing 2''', as a further improvement, two symmetrical plastic bushings 24''', which on their cylindrical surfaces facing the bore of the inner ring 13''' have notches 25''' distributed evenly over their circumference and on the ends axially removed from the bore have flanges 26''' directed radially outwardly. The flanges 26''' can be extended by means of outer rim portions 27''' beyond the inner rim of the supporting body 3''' to overlap the body 3''', thereby utilizing the bushing 24''' as an additional dust cover for the rolling-element bearing 2'''. In addition, by providing bushings 24''', which may be of an injection-molded plastic or the like, the noise generated by the rolling-element bearing 2''' and by the roller can be greatly reduced to achieve an environment-compatible design. Moreover, the bushings 24''' can be economically manufactured in a wide variety of diameters so that the roller may be used with axles of widely differing diameters.

FIG. 10 shows a further preferred embodiment of a plastic bushing 24'''' in enlarged cross-section. Here the bushing 24'''' is substantially identical to the one shown in FIG. 9 but the radially outwardly directed flange 26'''' is constructed without an extended rib section 27''''.

As a modification of the preferred embodiments described, the seat for the outer ring 10 or 10' of the rolling-element bearing formed by opposed ring-shaped lugs 9, 9' or 9" may be provided with a plurality of inwardly directed radial projections, dogs or the like on which the outer ring of the rolling-element bearing can be supported. This would have the advantage of compensating for any variation in diameters due to manufacturing tolerances of the inner surface of the ring-shaped lugs 9, 9' or 9".

It is to be appreciated that other and further modifications of, and alterations to, the disclosed embodiments may be made without departing from the spirit and scope of the invention.

What is claimed is:
1. A roller comprising a tread body made of an elastic material,
a supporting body, and
a rolling-element bearing having an outer ring and an inner ring disposed in said supporting body, said supporting body interconnecting said tread body and said bearing without axial play and including two half shells, at least one of said shells having a plurality of pins distributed over a surface thereof and projecting axially of the tread body, said shells each having an axially projecting ring-shaped lug, the lugs of the two shells encircling and engaging opposite outer surfaces of the outer ring of the rolling-element bearing, said shells having radially inner rims engaging opposite sides of said outer ring, the other of said shells having apertures receiving said pins for connecting said other shell to said one shell.

2. A roller as in claim 1, wherein each said shell has a plurality of pins distributed over a surface thereof and projecting axially of the tread body and an inner rim with an axially projecting ring-shaped lug, said lugs being directed toward each other and encircling the outer ring of the rolling-element bearing.

3. A roller as in claim 2, in which said apertures are holes, wherein the pins of said one half shell extend through said holes in the other half shell and are deformed at their ends thereby forming heads to join the two half shells together.

4. A roller as in claim 3 wherein the pins are peened over on their ends to form heads.

5. A roller as in claim 4, wherein the ends of the pins are peened over by means of a cross-shaped punch.

6. A roller as in claim 3, wherein the pins are riveted on their free ends to form the heads.

7. A roller as in claim 2, wherein the pins on the half shells interlock.

8. A roller as in claim 7, wherein of every two interlinking pins of the half shells, one is provided on its face with a recess and the other on its face with a projection engaging the recess.

9. A roller as in claim 8, wherein the pins of a half shell are alternately provided with a recess and a projection.

10. A roller as in any of claims 2 through 9, wherein a seat for the outer ring of the rolling-element bearing is formed by said lugs and comprises a plurality of inwardly directed radial projections which are evenly distributed over the periphery thereof.

11. A roller as in claim 10, wherein the half shells of the supporting body are made of a material having good thermal conductivity.

12. A roller as in claim 11, wherein the half shells of the supporting body comprise projections to increase the area of the heat-radiating surfaces.

13. A roller as in claim 10, wherein the half shells of the supporting body are made of a plastic.

14. A roller as in claim 13, wherein the two half shells of the supporting body are joined together by ultrasonic welding.

15. A roller as defined in claim 1, further comprising at least one bushing made of a plastic and having a radially outwardly directed flange disposed in the bore of the inner ring of the rolling-element bearing.

16. A roller as in claim 15, wherein the outwardly directed flange extends beyond the inner rim of the half shells of the supporting body and with it forms a seal.

17. A roller as defined in either of claims 15 and 16, wherein said bushing has at least one notch on its periphery.

18. A roller as in claim 1 wherein said half shells have outer rims with mutually facing portions which are curved in an axial direction.

19. A roller according to claim 18 wherein said rim portions are concave.

20. A roller according to claim 18 wherein said portions are convex.

21. In a roller having an annular tread body of an elastic material, a rolling-element bearing having inner and outer bearing rings and a plurality of rolling elements there between, and a support body between and interconnecting said tread body and outer bearing ring; the improvement wherein said support body is comprised of a pair of substantially identical annular elements having outer rims engaging opposite sides of said tread body and abutting inner rims engaging opposite sides of the outer surface of said outer ring and opposite ends of said outer ring, each of said support body elements having axially extending pins distributed thereon, and distributed aperture means receiving the axially extending pins of the other of said elements, said pins and apertures interconnecting said elements to support said bearing and tread body therebetween.

* * * * *